US011472601B2

(12) United States Patent
Hartley et al.

(10) Patent No.: US 11,472,601 B2
(45) Date of Patent: Oct. 18, 2022

(54) STORAGE CONTAINER

(71) Applicant: The Decor Corporation Pty. Ltd., Dandenong South (AU)

(72) Inventors: Toby Hartley, Keysborough (AU); George Kotsiopoulos, Keysborough (AU); Alexander Schoenmakers, Keysborough (AU); Justin Armistead, Keysborough (AU)

(73) Assignee: The Decor Corporation Pty. Ltd., Dandenong South (AU)

( * ) Notice: Subject to any disclaimer, the term of this patent is extended or adjusted under 35 U.S.C. 154(b) by 61 days.

(21) Appl. No.: 16/781,681

(22) Filed: Feb. 4, 2020

(65) Prior Publication Data

US 2020/0247581 A1 Aug. 6, 2020

(30) Foreign Application Priority Data

Feb. 5, 2019 (AU) .................................. 201910606
Feb. 5, 2019 (AU) .................................. 201910607
Feb. 5, 2019 (AU) .................................. 201910608
Feb. 5, 2019 (AU) .................................. 201910609
Nov. 7, 2019 (AU) ............................... 2019261778

(51) Int. Cl.
*B65D 21/02* (2006.01)

(52) U.S. Cl.
CPC ..... *B65D 21/0222* (2013.01); *B65D 21/0215* (2013.01); *B65D 2543/00648* (2013.01)

(58) Field of Classification Search
CPC ............ B65D 21/0222; B65D 21/0215; B65D 2543/00648
USPC ................................ 206/508, 509, 511, 512
See application file for complete search history.

(56) References Cited

U.S. PATENT DOCUMENTS

| 2007/0187277 A1 | 8/2007 | Furlong |
| 2009/0173656 A1* | 7/2009 | Furlong ............... B65D 21/022 206/508 |
| 2010/0176022 A1 | 7/2010 | Furlong |
| 2013/0233855 A1 | 9/2013 | DeSiena |

FOREIGN PATENT DOCUMENTS

| AU | 201910606 S | 3/2019 |
| AU | 201910607 S | 3/2019 |
| AU | 201910608 S | 3/2019 |
| AU | 201910609 S | 3/2019 |

OTHER PUBLICATIONS

Eng Wei Soo; Examination Report; Australian Patent Application No. 2019261778; dated Dec. 5, 2019; Australian Patent Office; Canberra, Australia.

* cited by examiner

*Primary Examiner* — Andrew D Perreault
(74) *Attorney, Agent, or Firm* — Stevens & Showalter LLP

(57) ABSTRACT

The present invention relates to a storage container comprising a base having a continuous side wall extending upwardly from a bottom wall and terminating at a top peripheral rim defining an upper opening. The container has a lid to open and close the upper opening, and the base of the container has a foot in the form of a rib on the underside of the bottom wall, in which the rib snap connects with a mating lid recess on an upper surface of the lid. In addition, the foot is profiled with a lead-in portion on the rib that is configured to guide the rest of the foot into the lid recess, and the foot is further profiled with a retaining portion on the rib that follows the lead-in portion to snap connect with the lid recess.

16 Claims, 12 Drawing Sheets

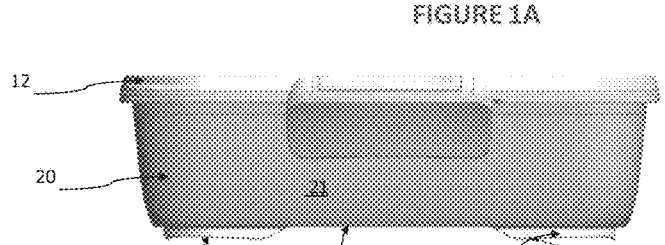
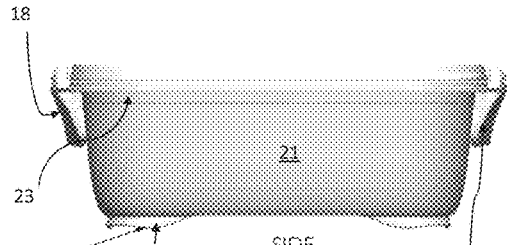
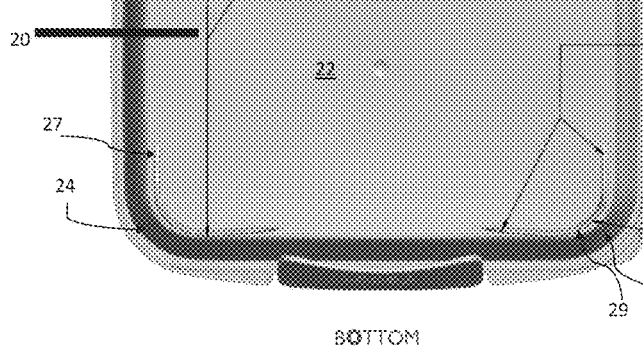

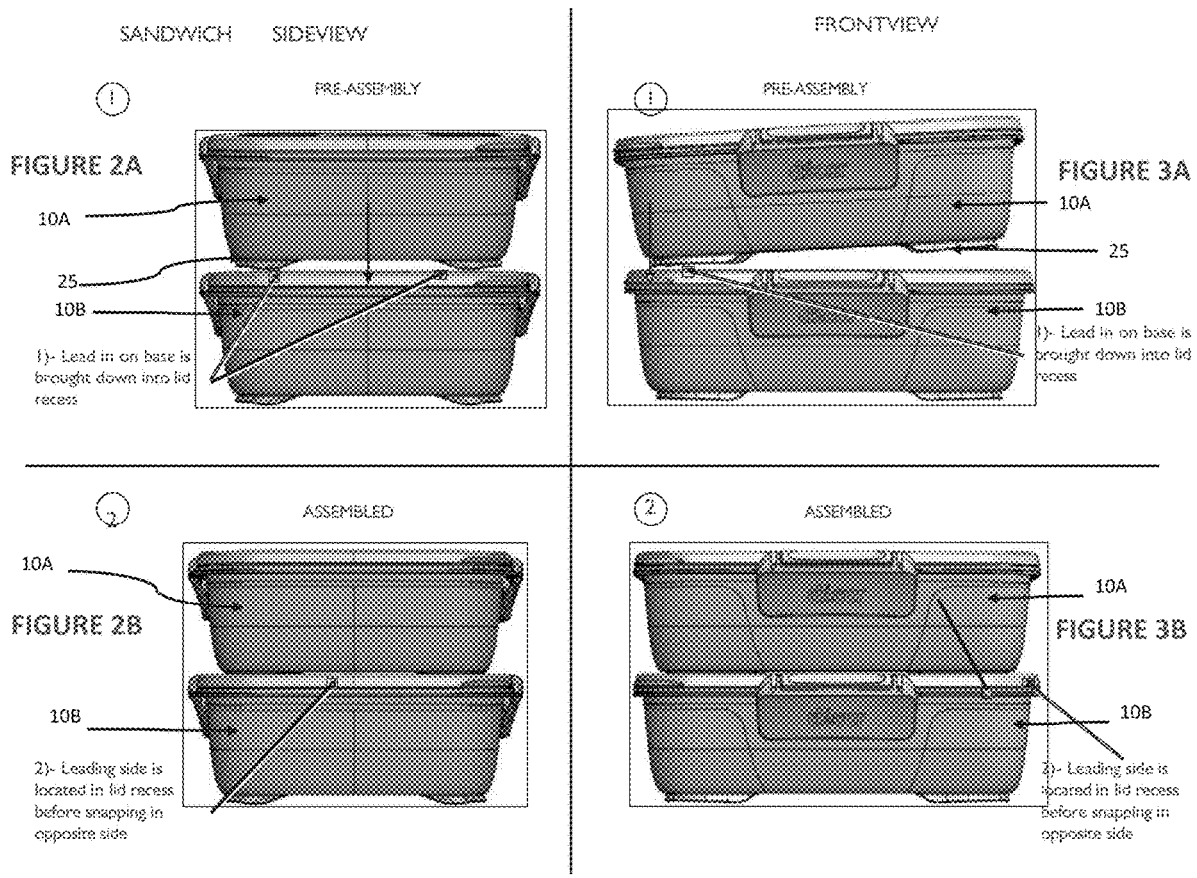

1)- Side lead in on base is brought down into lid recess

1)- Side lead in on base is brought down into lid recess

2)- Up-sweep rib form guides base further into recess

2)- Up-sweep rib form guides base further into recess

3)- Wave shape guides undercut into lid

3)- Wave shape guides undercut into lid

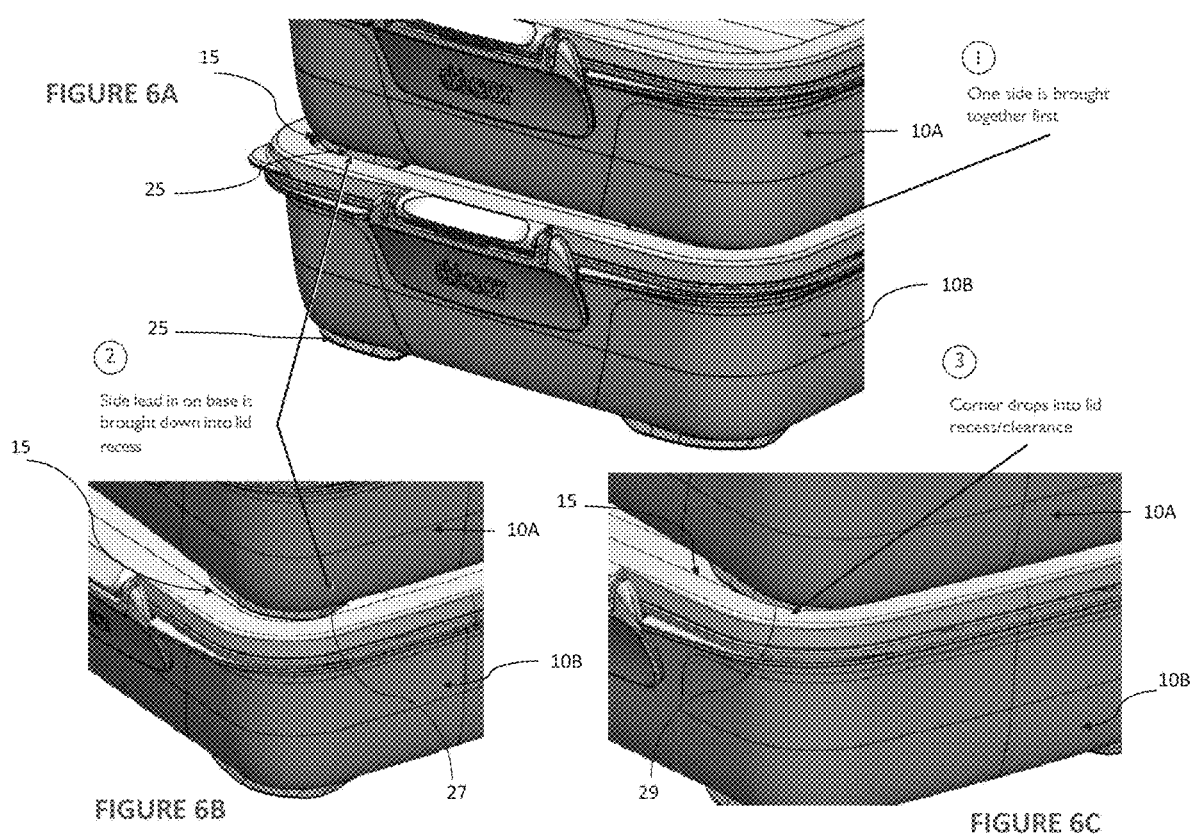

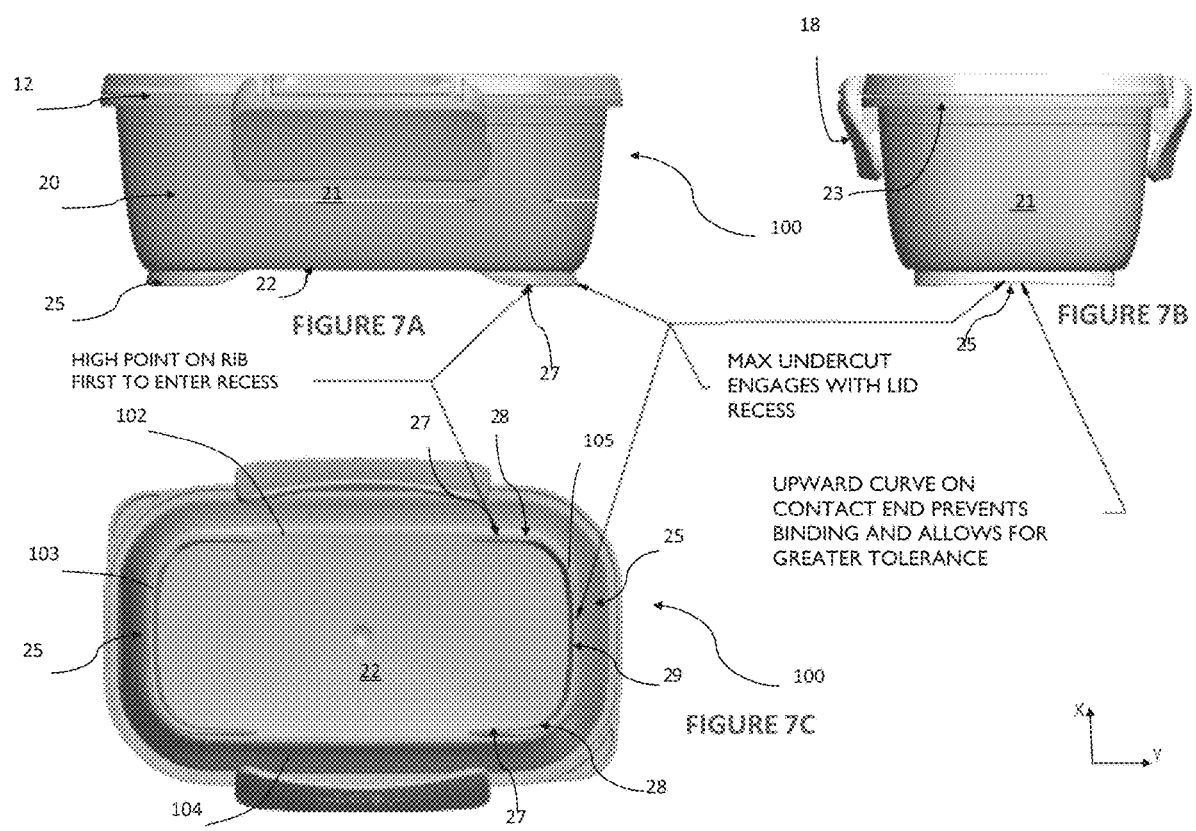

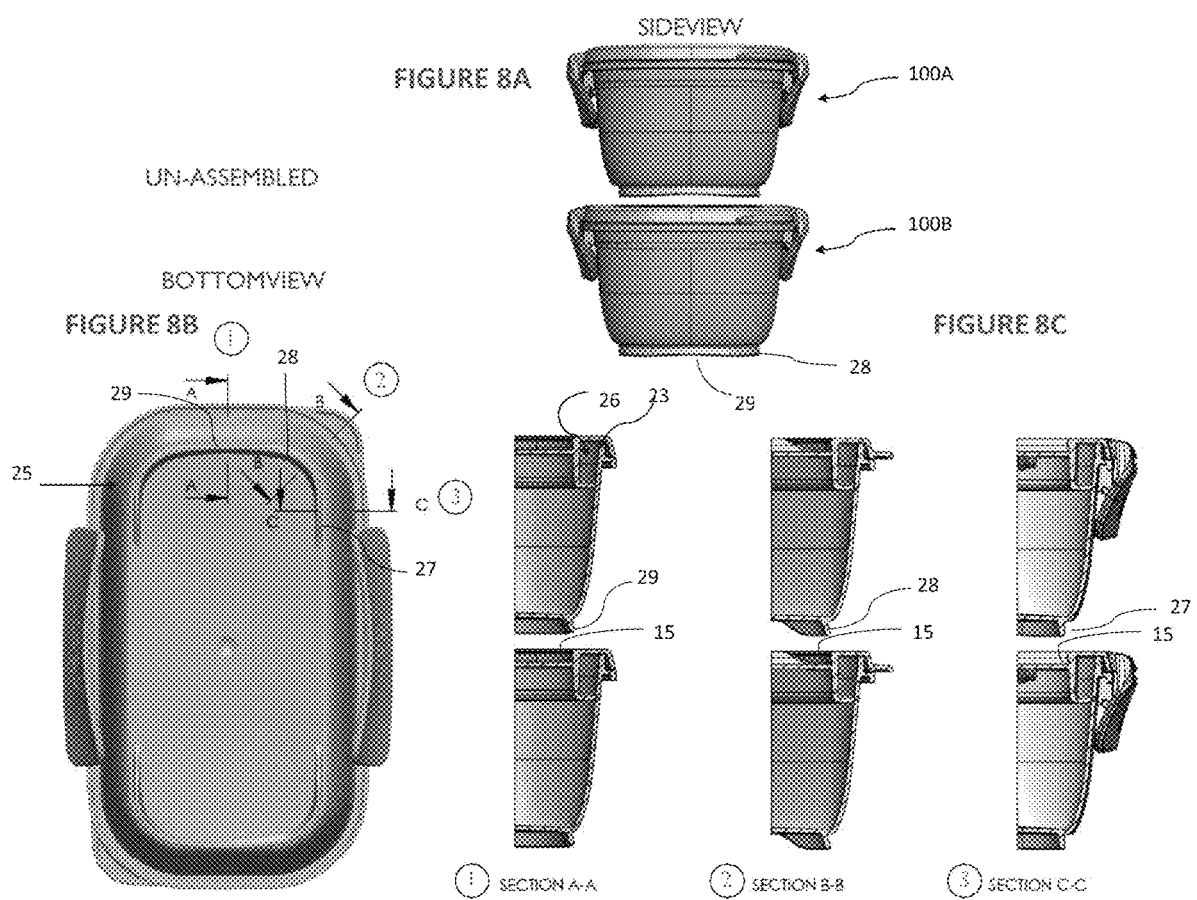

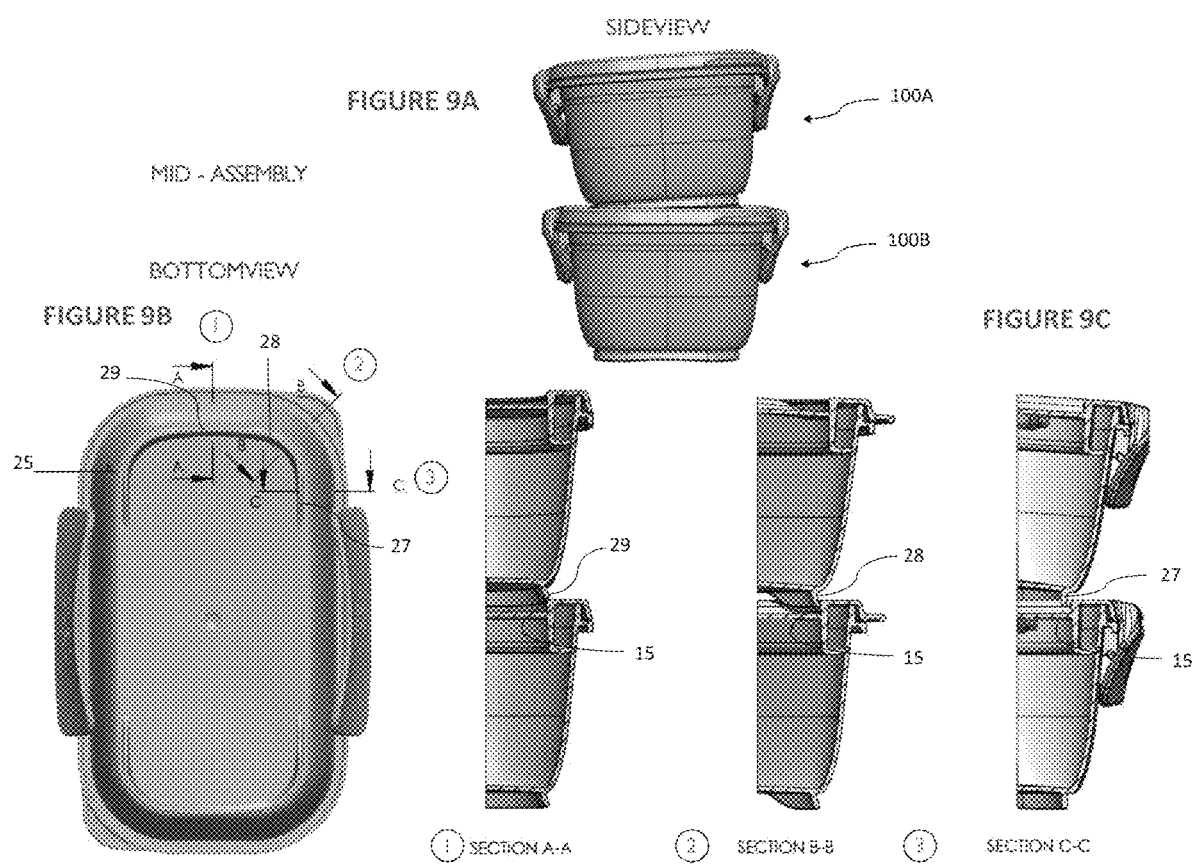

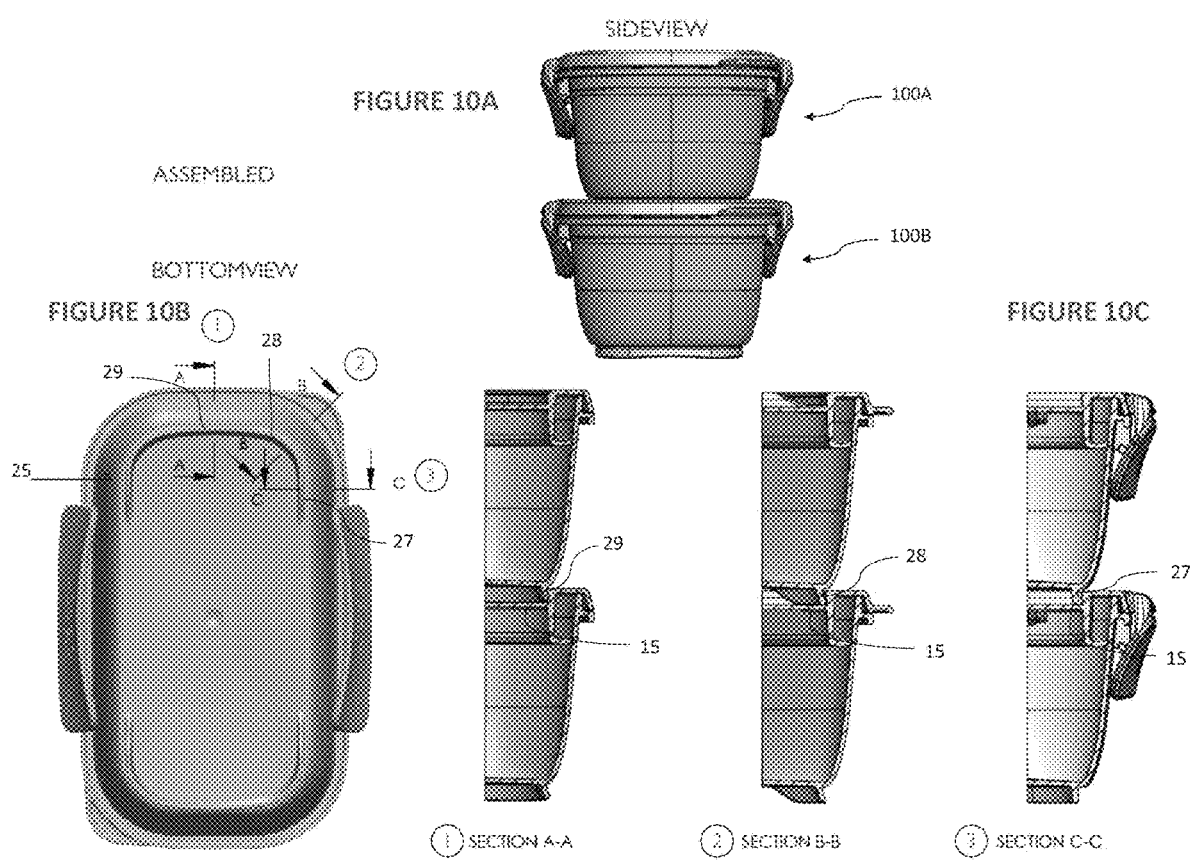

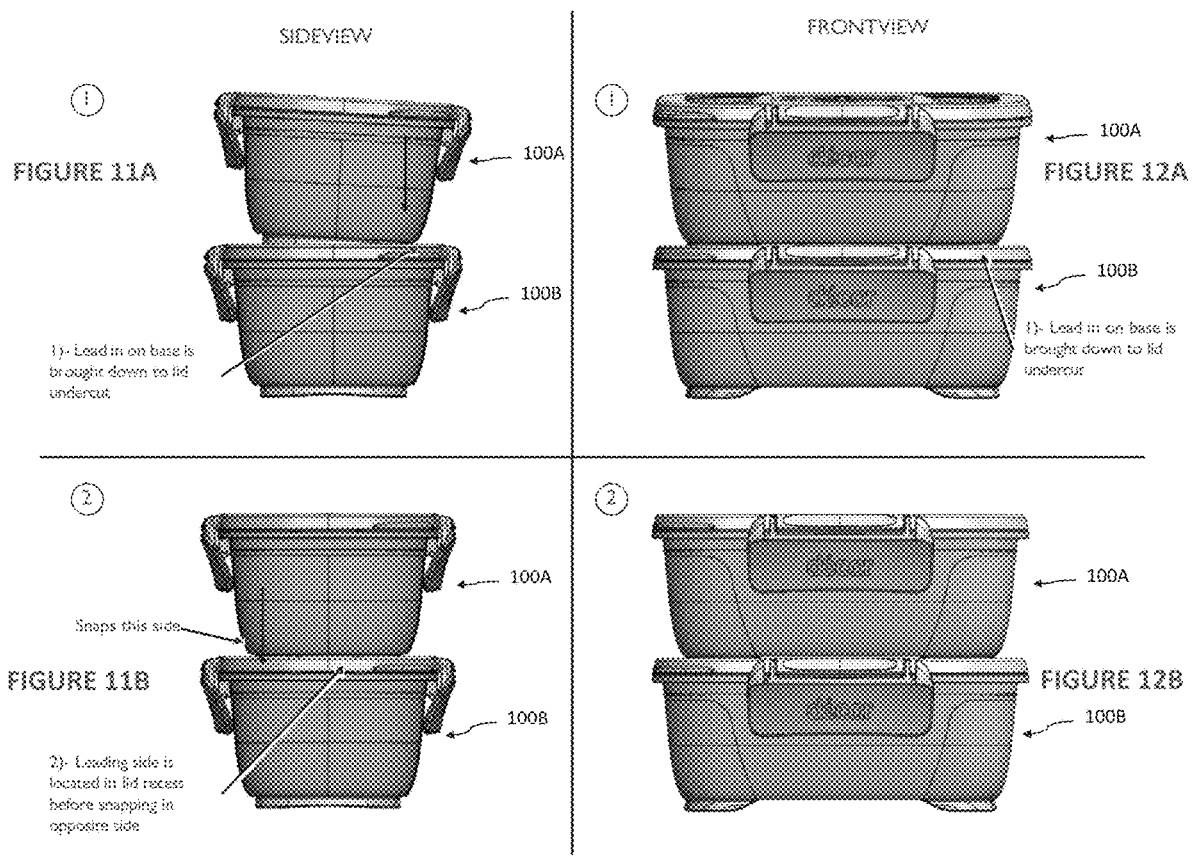

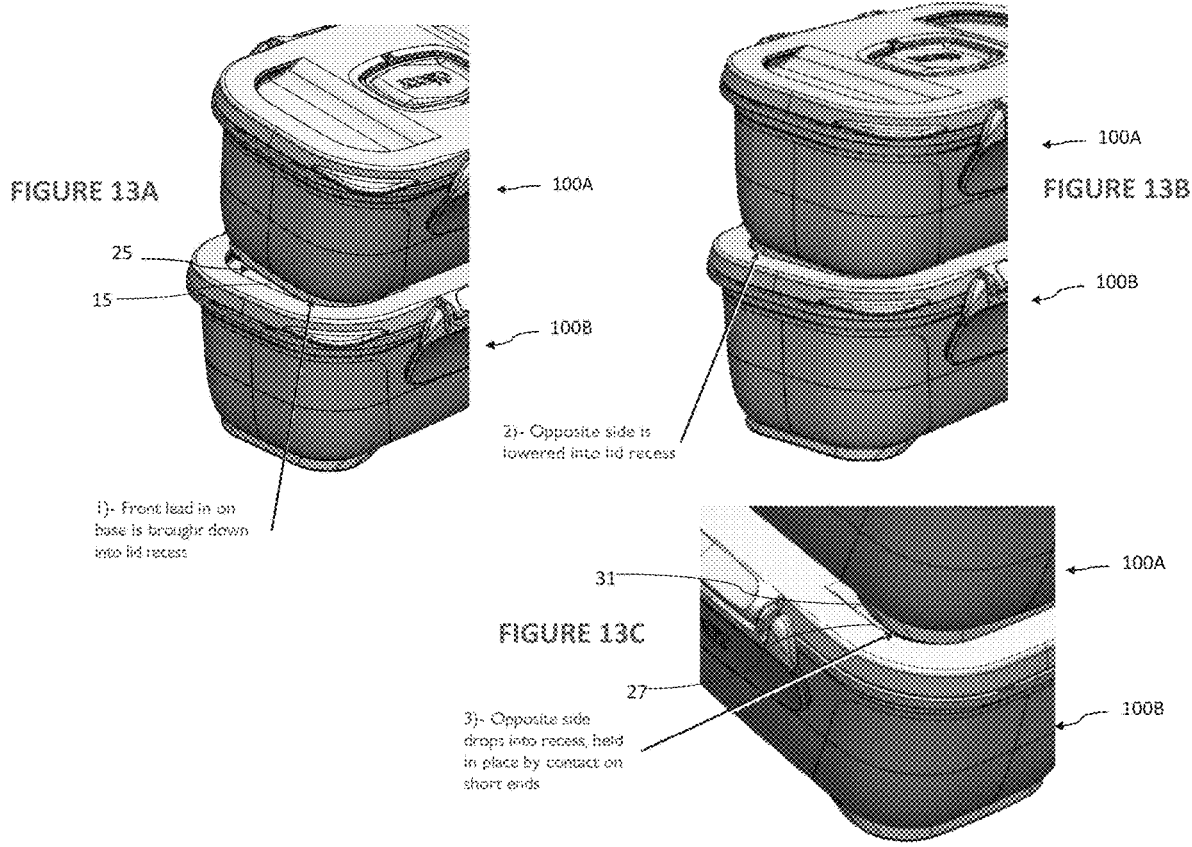

STORAGE CONTAINER

The present invention relates to a storage container and a set of storage containers where the base of the storage container is capable of connecting with the upper surface of a lid of the storage container in an engaging relationship.

BACKGROUND

Consumers are afforded the luxury of choice when selecting household and kitchen containers. There are many subtle variations in container styles and features, and some with more creative variations, but all will still need to generally function as a container to securely store contents within a base and optionally have a lid that can be secured to the base.

Re-usable containers, as opposed to single use containers, are made of a higher quality material that is designed for re-use, are aesthetically more attractive, can withstand large changes in temperature and may have any number of features to attract consumers to a more functionally designed product. Such features could include improved sealing means for a leakproof seal between lid and base, ergonomically designed handles or lid tabs for easier opening, vent buttons and side clips for confidently securing lids to bases.

The present invention has been developed by a desire to offer a container that consumers will find useful.

SUMMARY

In accordance with the invention there is provided a storage container comprising a base having a continuous side wall extending upwardly from a bottom wall and terminating at a top peripheral rim defining an upper opening; a lid fitting across the upper opening to close the upper opening; the base having a foot in the form of a rib on the underside of the bottom wall that snap connects with a mating lid recess on an upper surface of the lid, wherein the foot is profiled with a lead-in portion on the rib that is configured to guide the rest of the foot into the lid recess, and the foot being further profiled with a retaining portion on the rib that follows the lead-in portion and snap connects with the lid recess.

Aside from the storage container having a lid that fits across the open base to close the lid, the container has the additional feature in that the base can click onto, or snap connect to, the upper surface of the lid. This is useful from a storage perspective to keep the lid and base together. Furthermore, this feature is also useful where there are multiple containers that in a closed state holding contents can modularly snap together and be stacked one on top of the other.

In a preferred embodiment the lead-in portion is configured to enter the lid recess before the rest of the foot. The lead-in portion provides ease of entry of the foot into the lid recess to specifically lead the retaining portion into the lid recess, which in comparison has a profile that is more difficult to engage because the retaining portion is profiled to interact more tightly with the lid recess, namely in order to snap connect with the lid recess. The lead-in portion provides a means for gradually inserting the foot, and the retaining portion that follows, into the lid recess until the base and lid click together. This avoids requiring a sudden large pressing force to snap the base onto the lid to overcome a projection/groove detent engagement feature because the pressing force is gradually distributed along the length of the foot from the lead-in portion to the retaining portion rather than concentrated at one point.

In a preferred aspect the lead-in portion and the retaining portion are provided along the length of the rib foot, where the rib projects from the underside of the bottom wall, which defines a height of the rib. The rib projection is also defined by a rib length, which is the length the rib extends along the underside of the bottom wall. The lead-in portion preferably transitions into the retaining portion through a transition portion.

In one embodiment of the invention the lead-in portion of the foot (or rib) has a greater vertical height relative to the underside of the bottom wall than the vertical height of the retaining portion. This greater height encourages the lead-in portion to be the first portion of the foot to enter the lid recess, even when the base is brought down horizontally level onto the upper surface of the lid.

Furthermore, in one embodiment the retaining portion of the foot has a height profile that flares horizontally further outwardly from the underside of the bottom wall than the lead-in portion. This outward flare along the vertical height of the rib at the retaining portion assists in giving the lid recess a purchase point on the foot so as to retain the foot in the lid recess. By comparison the lead-in portion has a height profile that is generally vertically straight, namely substantially perpendicular to the underside surface of the bottom wall, or at least less flared than the retaining portion so that there is a difference in the ease of engagement between the lead-in portion and the retaining portion with the lid recess, whereby the lead-in portion is more easily engaged. Conversely, there is therefore also a difference in retention within the lid recess between the lead-in and retaining portions, whereby the retaining portion exercises a better retention, or engagement, with the lid recess.

The foot in one embodiment is ribbon-shaped in cross section, also described as flanged, and having a vertical height that is longer than a width. Accordingly, the foot can depend downwardly from the bottom wall at a vertical height. The vertical height can change, as discussed above, along the length of the foot where the retaining portion of the foot is shorter in height than the lead-in portion. Additionally, the ribbon-like shape of the foot allows the foot to flare outwardly of the container by changing the angle at which the foot depends downwardly from the bottom wall, namely at the retaining portion. Having a ribbon-like rib as a foot allows smooth transition from the vertically oriented taller lead-in portion to the shorter retaining portion that is outwardly flared at an angle.

It is understood that while in the embodiment described herein there are two differences between the lead-in portion and the retaining portion, namely the height of the foot and the flare angle, there need only be one difference for the product to work, where that difference could be a difference in foot height, a difference in outward flare or another difference, as described next. By way of another example, there may be a difference in rib flare between the two portions but they may still have the same height.

Furthermore, there may exist an altogether different feature between the two portions which still achieves the same end result, namely that defines the lead-in portion of the foot as that which provides initial engagement with the lid recess and that defines the retaining portion as that which holds the engagement between the lid and base. Such a feature could include, by way of example, a thicker cross-section at the retaining portion or further still a bead facing outwardly on an outside of the foot, which bead increases or decreases in intensity depending on whether that portion of the foot is leading in the rest of the foot (decreased bead presence) or retaining the foot (increased bead presence).

Further still, and as contemplated herein, the path followed by the foot along its length, particularly where the foot round a corner of the bottom wall, may flare or have a more pronounced curve at the corner when viewed from the underside of the base, namely along an x-y plane as shown in FIG. 10. This pronounced curve forces the retaining portion even further against the lid recess thereby enhancing the purchase of the recess on the foot. The ends of the foot therefore taper away from a snap fit engagement with the lid recess and will drop into, or engage, the lid recess without applying any significant holding force.

The transition portion of the foot preferably bridges or transitions the foot profile at the lead-in portion to the foot profile at the retaining portion.

In the above embodiments, the lid recess may have a profile cooperating with or corresponding to, the profile of the foot. In other words, the lid recess could be a negative profile to the positive projections and/or flaring of the foot. Because the foot has a lead-in portion and a retaining portion, the profile of the lid recess need not be tightly toleranced with the foot but could have a substantially opposing profile without accurately reflecting the exact negative dimensions of the foot and so will have a greater engagement tolerance yet still operate effectively to engage with the foot. This makes the manufacturing process of the container easier and more efficient as tolerances need not be entirely accurate.

The lid recess is preferably defined as a groove or channel between a wall at a perimeter of the lid's upper surface and a lower indentation on the upper surface. Accordingly, the foot engages the lid from a side-facing entry on the lid surface and not necessarily an upward facing entry. The lower indentation at the recess may ramp upwardly towards a raised ramp section on the lid surface, preferably centrally of the lid, which can assist with guiding the foot into the recess as the foot is guided by the ramp leading into the lid recess.

The foot in the form of a rib projecting from the underside of the bottom wall may take several shapes on the underside of the bottom wall. In one embodiment the foot is curved through approximately 90° to follow the curvature of the side edge of the bottom wall where it meets adjacent side wall panels of the continuous side wall. Depending on the shape and size of the container, and taking an oblong shaped container by way of example, the foot may be a discrete projection rounding one corner of the bottom wall or may extend around two corners so that in this instance the foot starts at one end at near an edge of a first long side wall panel, rounds the corner at 90° adjacent to a second shorter side wall panel and then rounds the next corner again at 90° to end adjacent to a second long side wall panel that is parallel to the first panel.

Alternatively, the foot could be provided as a straight rib running on the bottom wall underside and alongside the edge at which the bottom wall meets the side wall. There may be more than one foot provided discretely on the bottom wall in order to support the container, or there may be one continuous foot extending around the bottom wall close to its perimeter.

Of course, where the container is round, or rounded, and there is no distinction of corners the foot may be provided as a non-continuous rib or a continuous rib around the bottom wall near the edge where the bottom wall meets the side wall. The term 'near' or 'close' is understood to mean the close proximity of the foot to the edge at which the bottom wall meets the side wall such that the foot or feet can function as a foot of the container, and namely to stably support the container on a surface. Typically, this means the foot will be positioned on the bottom wall closer to the side wall than to a central point on the bottom wall.

In a further embodiment, and to assist in initial engagement and guiding of the foot into the recess, the end or ends of the foot taper from a foot height down to meet the bottom wall.

In a preferred embodiment the foot is moulded from a rigid plastic material, and preferably integrally moulded with the base.

DESCRIPTION OF THE DRAWINGS

In order that the invention be more clearly understood and put into practical effect, reference will now be made to preferred embodiments of an assembly in accordance with the present invention. The ensuing description is given by way of non-limitative example only and is with reference to the accompanying drawings, wherein:

FIGS. 1A, 1B, 10 and 1D are views of a first embodiment of a container comprising a base with lid, where those views are respectively a front elevated view, a side elevated view, a bottom view and a top view;

FIGS. 2A and 2B are elevated side views of two stacked containers of the first embodiment being assembled one above the above, where FIG. 2A shows the containers pre-assembly and FIG. 2B shows the containers assembled;

FIGS. 3A and 3B are similar to FIGS. 2A and 2B but illustrating the two stacked containers from an elevated front view;

FIG. 4A shows a pre-assembled step, FIG. 4B shows the containers beginning to be engaged, and FIG. 4C illustrate the containers almost fully engaged;

FIGS. 6A, 6B and 6C illustrate one assembly technique of the first embodiment that involves engaging first one side of the upper container with the lower container and then secondly bringing an opposite side of the top container into engagement with the bottom container, where FIGS. 6A and 6B illustrate first and second upper isometric views of the engagement of the first side of the container and FIG. 6C illustrates from the second upper isometric view the top container leading into the engagement of the second side;

FIGS. 7A, 7B, 7C and 7D are views of a second embodiment of a container comprising a base with lid, where those views are respectively a front elevated view, a side elevated view, a bottom view and a top view;

FIGS. 8A and 8B are respectively a side elevated view and a bottom view of two containers of the second embodiment positioned one above the other pre-assembly;

FIG. 8C illustrates three cross-sectional views taken from FIG. 8B at sections A-A, B-B and C-C;

FIGS. 9A and 9B are respectively a side elevated view and a bottom view of two containers of the second embodiment positioned one above the other mid-assembly;

FIG. 9C illustrates three cross-sectional views taken from FIG. 9B at sections A-A, B-B and C-C;

FIGS. 10A and 10B are respectively a side elevated view and a bottom view of two containers of the second embodiment positioned one above the other in an assembled state;

FIG. 10C illustrates three cross-sectional views taken from FIG. 10B at sections A-A, B-B and C-C;

FIGS. 11A and 11B are elevated side views of two stacked containers of the second embodiment being assembled one above the above, where FIG. 11A shows the containers pre-assembly and FIG. 11B shows the containers assembled;

FIGS. 12A and 12B are similar to FIGS. 11A and 11B but illustrating the two stacked containers from an elevated front view; and FIGS. 13A, 13B and 13C illustrate one assembly technique of the second embodiment that involves engaging first one side of the upper container with the lower container and then secondly bringing an opposite side of the top container into engagement with the bottom container, where FIG. 13A illustrates a first upper isometric views of the engagement of the first side of the container and FIGS. 13B and 13C illustrate from the first upper isometric view and a second isometric view the top container leading into the engagement of the second side.

DETAILED DESCRIPTION OF THE EMBODIMENTS

Figure 1D:
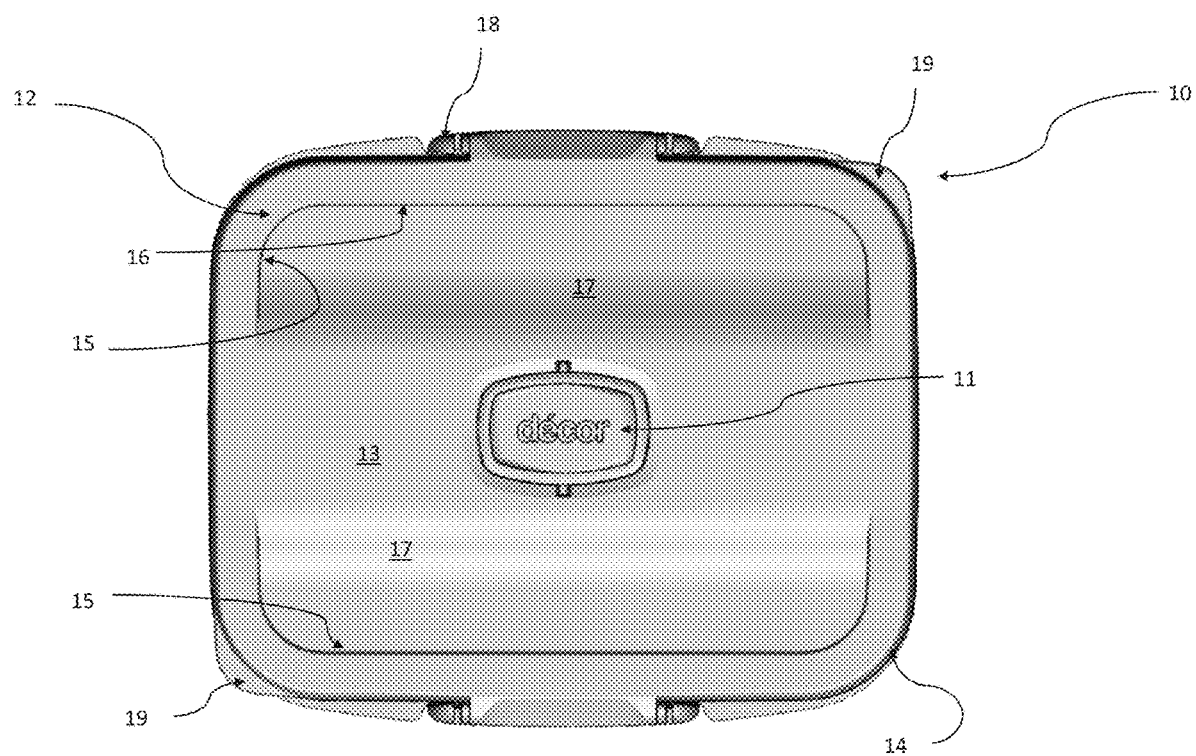

FIGS. 1A to 6C illustrate a first embodiment of the storage container 10 referred to as 'sandwich'. FIGS. 7A to 13C illustrate a second embodiment 100 of the storage container referred to as 'snack'. The drawings illustrate the features of the container lids 12 and bases 20 that allow the feet 25 of the bases to snap into a corresponding mating recess 15 on the lid. The same reference numerals are used for both embodiments where the features are the same.

FIGS. 1A, 1B, 10 and 1D respectively illustrate a front view, side view, bottom view and top view of the first embodiment of the storage container 10. The storage container has a base 20 with a continuous side wall 21 extending upwardly from a bottom wall 22 of the base 20. The side wall 21 terminates at an upper end with a top peripheral rim 23, which defines an upper opening 26 of the base. While an oblong-shaped base 20 with corners 24 is shown, the base could be other shapes including round, or rounded, so that the side wall 21 appears more as a single continuous side wall extending upwardly from the periphery of the bottom wall 22 than the more delineated side wall of an oblong or square shaped base.

The containers 10, 100 illustrated are also provided with hinged clips 18 on two opposing sides to assist in keeping the lid 12 securely attached to the base 20, and a vent button 11 that can be opened to allow steam to escape from the container when the contents are hot. A seal (not shown) could also be provided on the underside of the lid to create a sealed attachment between the lid and base, and finger tabs 19 on the lid assist a user to grip the lid in pulling it off the base.

As discussed above, the base has at least one foot 25. In the first embodiment there are four feet 25 extending from the underside of the bottom wall 22 and roughly located at each corner of the oblong-shaped base. The feet 25 are in the form of a rib on the underside of the bottom wall. The feet 25 are adapted to snap connect with a mating lid recess 15 on an upper surface of the lid 12.

The lid 12 is shown in FIGS. 1A-1D being shaped and sized to fit across the upper opening 26 of the base. The lid recess 15 is sized and shaped to snap connect with the foot or feet 25 of the base and may be a continuous groove or channel on the upper surface 13 of the lid set in from a lid perimeter 14. Alternatively, the lid recess may be a series of discrete grooves corresponding in number to the number of feet to be received. In the embodiments illustrated in the Figures the recess 15 is located between a recess wall 16 that drops from the upper surface close to the perimeter of the lid, and a lower region/indentation closer to the centre of the lid. The lower region is illustrated in the drawings as a ramp 17 inclining upwardly from the lower recess to a top of the upper surface 13 of the lid.

FIGS. 2A and 3A respectively illustrate a side view and a front view of two sandwich containers 10A and 10B in the process of being snap connected one on top of the other, with the feet 25 of the top container being engaged with the lid and lid recess 15 of the bottom container. FIGS. 2B and 3B respectively illustrate in side view and front view the two containers 10A and 10B assembled.

Figure 4A:
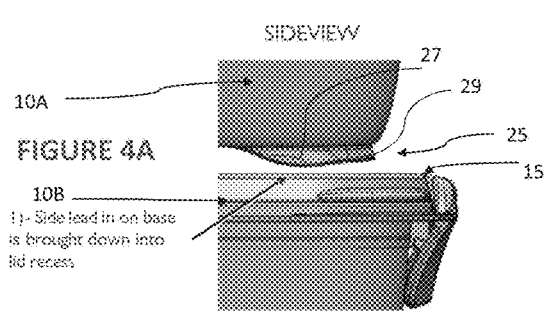
FIGS. 4A, 4B and 4C illustrate a series of steps in elevated side views of two stacked containers being assembled where
Figure 5A:
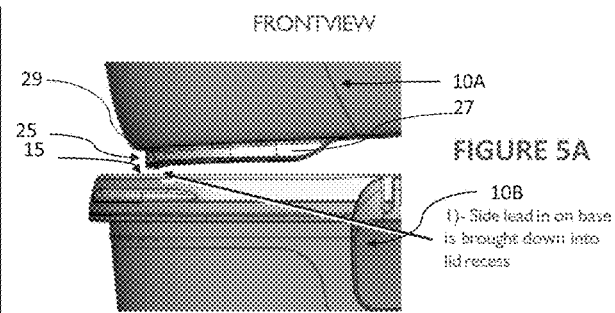
FIGS. 5A, 5B and 5C illustrate the same series of steps as FIGS. 4A, 4B and 4C but from the perspective of a front elevated view.
Figure 4B:
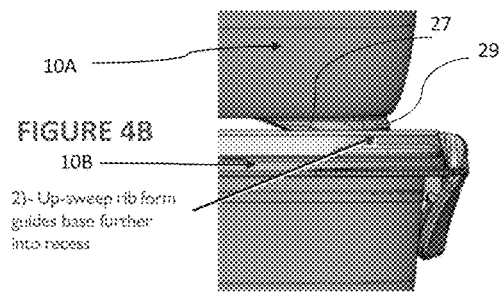
Figure 5B:
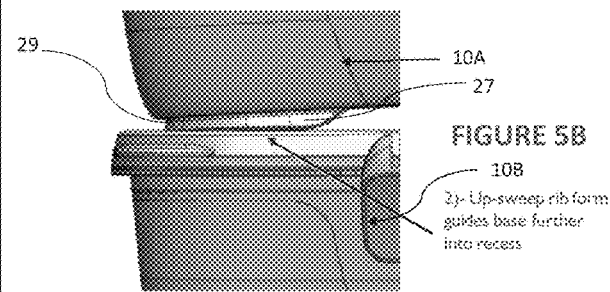
Figure 4C:
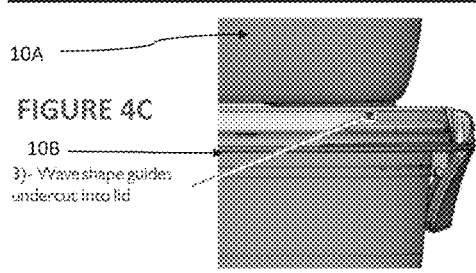
Figure 5C:
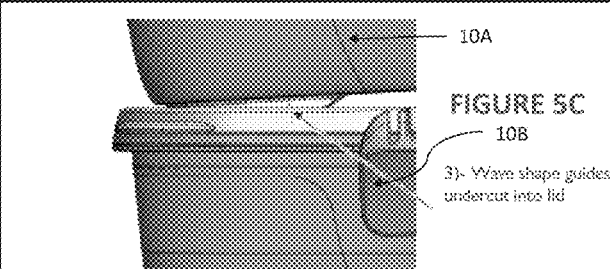

FIGS. 4A, 4B and 4C illustrate from a side view a three-step assembly process of containers 10A and 10B. Similarly, FIGS. 5A, 5B and 5C illustrate from a front view the same three-step assembly process.

FIGS. 6A, 6B and 6C illustrate the assembly process from an isometric view where FIG. 6A demonstrates one foot 25 at a corner of the container 10A engaging first with a mating lid recess 15 before an adjacent foot on container 10A is brought into engagement with its corresponding lid recess 15 on container 10B. FIG. 6B shows a first step of the foot 25 leading in to the recess 15 by its lead-in portion 27, while FIG. 6C shows the lead-in portion located in the recess 15 with the retaining portion 29 of the foot 25 following the lead-in portion into the recess 15.

This assembly process involves tilting a first side of the upper container base so as to slide the lead-in portion 27 into the recess 15 and then lowering an opposite, second, side of the container base to snap fit the foot on the opposite side of the container into the recess. It is understood that connection can still be made with less of a tilt that slides in the first side, which may require more of a downward connecting force to be applied. It is understood that the feet could be profiled so that the tilting assembly connection operates regardless of which opposing sides are selected to tilt between.

FIGS. 4A to 4C and 5A to 5C similarly illustrate the lead-in portions 27 of the feet entering the recess 15 first to gradually lower the retaining portions 29 into the lid recess. The lead-in portions 27 are profiled to provide less engagement resistance, or tolerance, with the lid recess 15 but to provide a leading guiding edge, having greater prominence to bring the retaining portion into the recess with a tighter fit. Accordingly, in the embodiment shown, the prominent profile of the lead-in portion 27 up-sweeps in a wave-like shape to guide the undercut of the retention-profiled retaining portion 29 into engagement with the lid recess. The portion on the rib foot between the lead-in portion 27 and the retaining portion 29 is the transition portion 28.

To be more prominent yet create less interference with the lid recess, the lead-in portion 27 as illustrated has a greater vertical height from the underside of the bottom wall compared to the vertical height of the retaining portion 29. Alternatively or additionally, the lead-in portion is also profiled to be more in line with the lid recess so as to easily drop into the recess without much interference. It is understood that only one feature is necessary to define the lead-in portion, namely a feature that either makes it easier for the lead-in portion to engage the lid recess than the retaining portion, or a feature that makes it more likely that the lead-in portion will naturally engage with the lid recess before the retaining portion.

Conversely, the retaining portion 29 is profiled to follow the lead-in portion and is therefore less encouraging of an easy engagement with the lid recess, as its main function is to, with the lid recess, retain the engagement between the base 20 and lid 12.

While the recess is described herein as a corresponding recess to the profiled feet, it is understood that the recess need not correspond precisely to the changing profile of the feet. The recess could instead have a constant profile that is sufficiently deep to make purchase with the retaining portion of the foot, but that could be relatively too large for lead-in portion. Indeed, one of the advantages of the present interconnecting configuration between the base and lid is that a good connection will still be made with a loose, or large, tolerance between the foot/feet and recess. This is by virtue of the foot having a profile that can achieve two functions with the recess on the top of the lid: ease of engagement and good engagement. Since the ease of engagement function is defined by the lead-in portion, which is less pronounced in profile than the retaining portion, it follows that the lead-in portion should fit comfortably within a recess that is designed to have a comparatively tighter tolerance with the retaining portion.

Figure 7D:
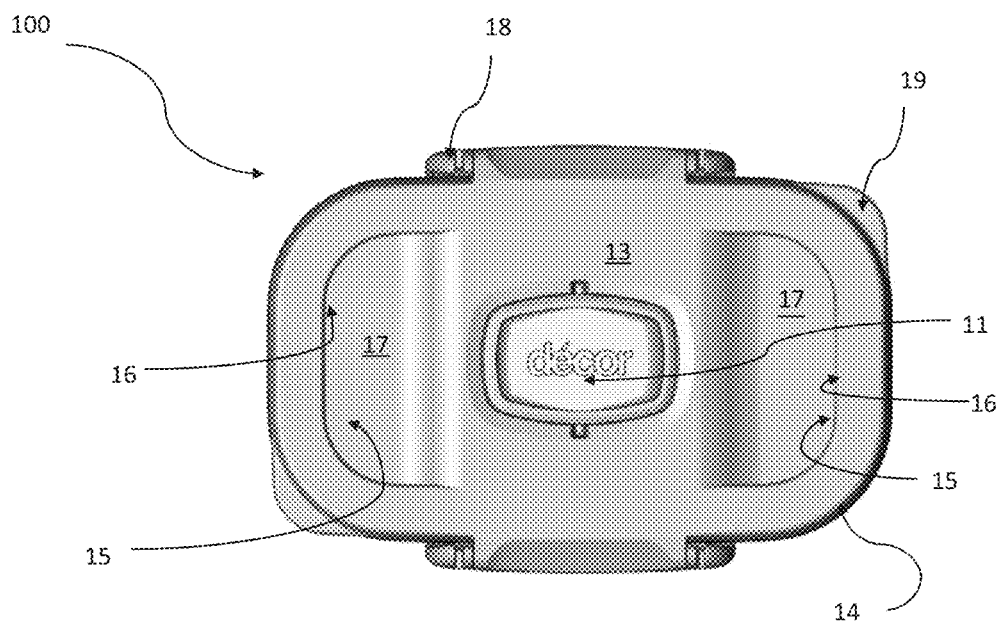

FIGS. 7A, 7B and 7C respectively illustrate a front view, side view and a bottom view of the second embodiment of the storage container 100, also referred to as a snack container 100. It too has a base 20 with a continuous side wall 21 extending upwardly from a bottom wall 22 of the base 20. In this embodiment there are two feet 25 protruding downwardly from the underside of the bottom wall 22, however the feet are not only located at the corners of the bottom wall but because the snack container 100 is smaller and longer in one direction than the sandwich container 10, each foot 25 wraps around a shorter side of the bottom wall at a location sufficiently close to the periphery of the bottom wall so as to provide stability when resting the container on a surface. Accordingly, FIG. 7A shows two feet 25 each extending from a first long side 102, around a corner and along an entire short side 103,105 and around the corner to terminate on the opposite long side 104 to the first side.

It is to be understood that the location of the feet on the bottom wall can vary but that the feet are intended to provide support for the storage container so it is assumed their location with respect to the periphery of the bottom wall and their configuration on the bottom wall should support the container on a surface as well as bear the features that allow a container base to engage with the top of a container lid.

FIGS. 8A-C, 9A-C and 10A-C are a series of steps showing two containers 100A and 100B being snap connected/engaged one on top of the other, where FIGS. 8A-C illustrate a storage containers 100A and 100B about to be connected, FIGS. 9A-C illustrate the containers in mid-assembly and FIGS. 10A-C illustrate the containers assembled. In each of the Figures the corresponding Figure letter shows the same view. For example, FIGS. 8C, 9C and 10C all show the same view but 8C shows the view before assembly, 9C at mid-assembly and 10C assembled.

Specifically, FIGS. 8A, 9A and 10A illustrate stacked containers 100A and 100B from an end view.

FIGS. 8B, 9B and 10B illustrate the underside of the stacked containers from a bottom view.

FIGS. 8C, 9C and 10C each show three cross sectional views taken from FIGS. 8B, 9B and 10B respectively, and namely: section A-A; section B-B and section C-C.

Section A-A is a cross section of the stacked containers 100A and 100B taken through a foot 25 at the retaining portion 29. Section B-B is a cross section of the stacked containers taken through the foot 25 at the transition portion 28. And section C-C is a cross section of the stacked containers taken through the foot at the lead-in portion 27.

By comparing the cross sections side by side in each Figure, the differences in the configuration and profile of the different portions of the feet become apparent. Referring to FIG. 9C, for example, top container 100A is tilted to one side to insert lead-in portion 27 into lid recess 15 before retaining portion 29. In this case, lead-in portion 27 need not be very different in height to the remaining portions because the tilting action encourages the lead-in portion 27 to enter the lid recess first. It should be noted that in the larger sandwich embodiment there is a difference in height between the lead-in and retaining portions that is more apparent.

However, as seen in FIG. 9C, the angle of flare from the bottom wall of the lead-in portion 27 is less than that of the retaining portion 29, so that the lead-in portion easily enters the lid recess 15 without any force. In contrast, it can be seen from FIG. 9C section A-A that the retaining portion has not yet entered the recess 15 and in fact sits slightly on top of the recess wall 16 because it has a greater angle of flare and infers that an amount of force could be required to make the retaining portion enter the recess. The transition portion 28 is shown in section B-B of FIG. 9C as just entering the recess, but not as engaged as the lead-in portion 27.

By FIG. 10C the lead-in portion 27 has guided the transition portion 28 into the recess 15, which has in turn finally guided the retaining portion 29 into the recess. As there is a gradual increase in force from engagement of the lead-in portion 27 increasing to the retaining portion 29, the force is distributed along the foot. This means there is no sudden impact or point load of force required in order to overcome the tight tolerance between the retaining portion 29 and the lid recess 15. The result is a container base that more easily snap connects on top of its corresponding container lid, yet still provides a good engagement hold between the two engaged parts.

FIGS. 11A and 11B show from a side view the connecting process in two steps—mid assembly and assembled, while FIGS. 12A and 12B show the same two step connecting process in front view.

FIGS. 13A, 13B and 13C show part isometric views of containers 100A and 100B in partially assembled states and in a close up view to show how the foot 25 engages with lid recess 15. As can be seen in FIG. 13C, foot 25 includes a taper 31 that assists in easing the lead-in portion 27 into lid recess 15.

The present invention provides an effective engagement between two stacked containers that will allow the containers to be stored, transported and grouped together without separating. Moreover, despite having a firm and effective engagement the containers may also be engaged together with ease. Providing both aspects of an effective engagement and a smooth engagement process is counter-intuitive because enhancing one aspect usually compromises the other. The present invention achieves both by having a base foot and lid recess that are correspondingly profiled with a lead-in portion that encourages ease of assembly and a retaining portion that provides a purchase point for engagement between the base and lid.

It is to be understood that, if any prior art publication is referred to herein, such reference does not constitute an admission that the publication forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, namely, to specify the presence of the stated features but not to preclude the presence or addition of further features in various embodiments of the invention.

It is to be understood that the aforegoing description refers merely to preferred embodiments of invention, and that variations and modifications will be possible thereto without departing from the spirit and scope of the invention, the ambit of which is to be determined from the following claims.

The invention claimed is:

1. A storage container comprising a base having a continuous side wall extending upwardly from a bottom wall and terminating at a top peripheral rim defining an upper opening;
a lid fitting across the upper opening to close the upper opening;
the base having a foot configured as a rib on an underside of the bottom wall that snap connects with a mating lid recess on an upper surface of the lid, the rib having a rib length defined by an extension of the rib spaced from a perimeter of the underside of the bottom wall so that the rib length follows alongside the perimeter, and a rib height defined by a projection of the rib from the underside of the bottom wall; wherein a profile of the foot has a lead-in portion on the rib that is configured to guide the rest of the foot into the lid recess, and the foot profile further having a retaining portion on the rib that follows the lead-in portion to snap connect with the lid recess, the lead-in portion and the retaining portion being provided at different portions along the rib length, and wherein the retaining portion has a width profile directionally perpendicular to the rib length, wherein the width profile flares horizontally outwardly from the underside of the bottom wall to enable snap connection with the lid recess, and an angle of flare of the lead-in portion, wherein the angle of flare of the lead-in portion is defined between the perimeter of the underside of the bottom wall and the lead-in portion, and an angle of flare of the retaining portion, wherein the angle of flare of the retaining portion is defined between the perimeter of the underside of the bottom wall and the retaining portion, wherein the angle of flare of the lead-in portion is greater than the angle of flare of the of the retaining portion.

2. The storage container claimed in claim 1, wherein the lead-in portion is configured to enter the lid recess before the rest of the foot.

3. The storage container claimed in claim 1, the lead-in portion of the foot has a profile that has a greater rib height relative to the underside of the bottom wall than the retaining portion.

4. The storage container claimed in claim 1, wherein the lid recess has a recess profile cooperating in profile with the foot profile.

5. The storage container claimed in claim 1, wherein the foot is curved through approximately 90° on the underside at a corner of the bottom wall.

6. The storage container claimed in claim 1, wherein the foot is straight on the underside of the bottom wall.

7. The storage container claimed in claim 1, wherein the foot is curved on the underside of the bottom wall to follow a wall perimeter.

8. The storage container claimed in claim 1, wherein the foot extends part way around a perimeter of the bottom wall.

9. The storage container claimed in claim 1, wherein the foot is a flange, or ribbon-shape, that extends part way around the bottom wall and depends downwardly from the bottom wall.

10. The storage container claimed in claim 9, wherein the lead-in portion is located at least at one end of the foot profile and the retaining portion is located between the ends of the foot profile.

11. The storage container claimed in claim 1, wherein profile of the foot also has a transition portion between the lead-in portion and the retaining portion.

12. The storage container claimed in claim 1, wherein the lid recess is defined between a raised wall at a perimeter of an upper surface of the lid and a lower indentation on the upper surface.

13. The storage container claimed in claim 12, wherein the indentation on the upper surface of the lid is a ramp section that inclines from a higher central portion of the lid down into the lid recess.

14. The storage container claimed in claim 1, wherein the foot and the base are moulded in a plastics material.

15. A set of interconnecting storage containers comprising two or more of the storage containers as claimed in claim 1, whereby the base of a first of the storage containers snap locks into a lid upper surface of a second of the storage containers.

16. The storage container claimed in claim 5, wherein the curve of the foot is pronounced to provide better purchase of the retaining portion in the lid recess.

* * * * *